US012317385B2

(12) United States Patent
Liang

(10) Patent No.: US 12,317,385 B2
(45) Date of Patent: May 27, 2025

(54) MULTIFUNCTIONAL DIMMABLE DRIVING POWER SUPPLY

(71) Applicant: Jianhua Liang, Guangning (CN)

(72) Inventor: Jianhua Liang, Guangning (CN)

(*) Notice: Subject to any disclaimer, the term of this patent is extended or adjusted under 35 U.S.C. 154(b) by 0 days.

(21) Appl. No.: 18/539,341

(22) Filed: Dec. 14, 2023

(65) Prior Publication Data

US 2024/0130016 A1 Apr. 18, 2024

(30) Foreign Application Priority Data

Nov. 29, 2023 (CN) ........................ 202323249810.4

(51) Int. Cl.
*H05B 45/24* (2020.01)
*H05B 45/315* (2020.01)
*H05B 45/325* (2020.01)
*H05B 45/355* (2020.01)

(52) U.S. Cl.
CPC ........... *H05B 45/24* (2020.01); *H05B 45/315* (2020.01); *H05B 45/325* (2020.01); *H05B 45/355* (2020.01)

(58) Field of Classification Search
CPC ...... H05B 45/20; H05B 45/24; H05B 45/315; H05B 45/325; H05B 45/355
See application file for complete search history.

(56) References Cited

U.S. PATENT DOCUMENTS 8,362,707 B2 * 1/2013 Draper .................. H05B 45/20 315/149
8,487,546 B2 * 7/2013 Melanson ............ H05B 45/327 315/297
9,961,724 B1 † 5/2018 Zheng
2009/0014442 A1 1/2009 Sakai et al.
2009/0079353 A1 3/2009 Sakai et al.
2010/0181935 A1 * 7/2010 Wu ................... H05B 41/3921 315/307
2012/0068611 A1 * 3/2012 Steiner ................ H05B 47/115 315/158
2013/0002143 A1 * 1/2013 Panaccio ............. H05B 45/375 315/297
2013/0235630 A1 9/2013 Sadwick et al.
2016/0330808 A1 * 11/2016 Brandt ................ H05B 45/375
2018/0195706 A1 * 7/2018 Chemel ................. G05B 15/02
2019/0098721 A1 * 3/2019 Udavant ............... H05B 45/20
2024/0172352 A1 † 5/2024 Zhao
2024/0196496 A1 * 6/2024 Zhao ................... H05B 45/325
2024/0206032 A1 † 6/2024 Wen

* cited by examiner
† cited by third party

*Primary Examiner* — Tung X Le

(74) *Attorney, Agent, or Firm* — Hemisphere Law, PLLC; Zhigang Ma

(57) ABSTRACT

The present disclosure discloses a multifunctional dimmable driving power supply, including an alternating current (AC) input, a high-power factor correction circuit, an AC/direct current (DC) conversion circuit, a load, a phase-cut input signal, an analog input signal, a micro control unit (MCU) control module, a multishift switching device, a metal oxide semiconductor field effect transistor (MOSFET) driving circuit, a rotational potentiometer, and a temperature sensor module. The multishift switching device on the power supply is used to select different frequency outputs, switch different color temperature values, and select different curve outputs, so that the multifunctional dimmable driving power supply has high universality.

1 Claim, 1 Drawing Sheet

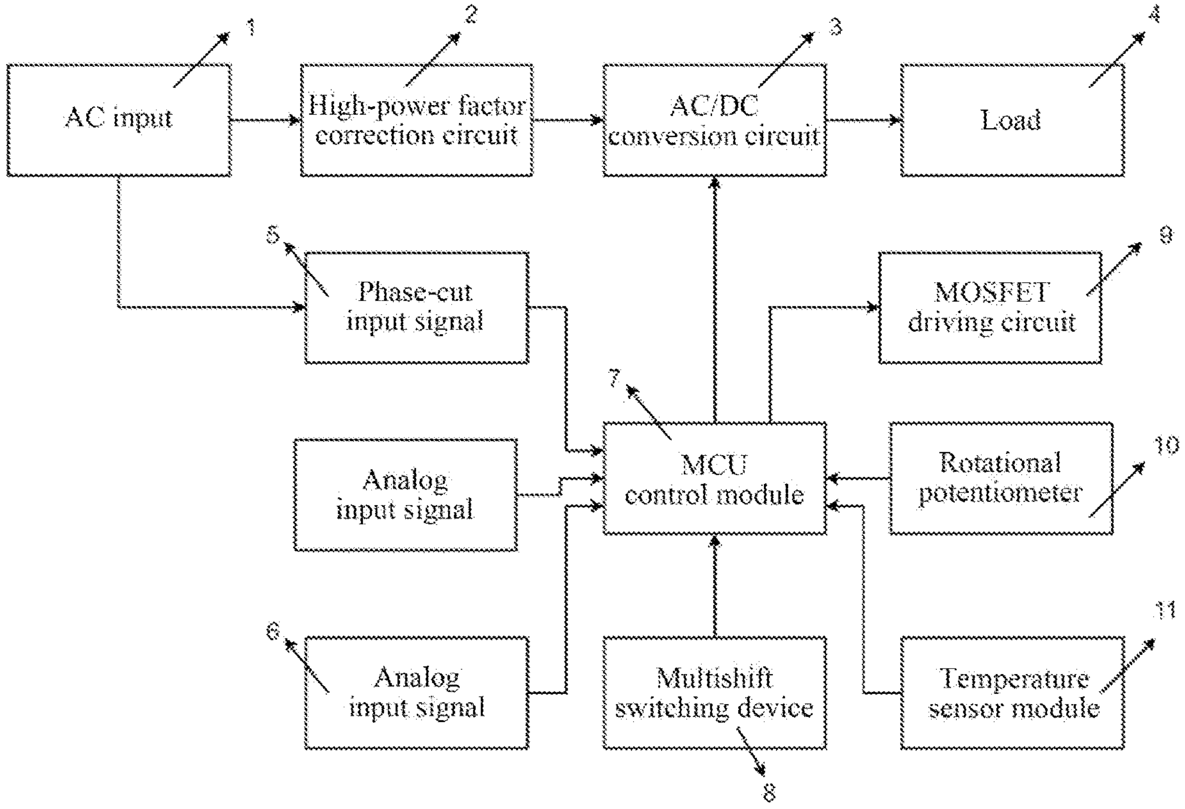
AC input
1
High-power factor correction circuit
2
AC/DC conversion circuit
3
Load
4
Phase-cut input signal
5
MOSFET driving circuit
9
7
MCU control module
Analog input signal
Rotational potentiometer
10
6
Analog input signal
Multishift switching device
8
Temperature sensor module
11

MULTIFUNCTIONAL DIMMABLE DRIVING POWER SUPPLY

TECHNICAL FIELD

The present disclosure relates to the technical field of driving power supplies, and in particular, to a multifunctional dimmable driving power supply.

BACKGROUND

An existing dimmable power supply has a fixed pulse width modulation (PWM) frequency output dimming function. The dimmable power supply is dimmed through a phase-cut dimmer or an analog signal dimmer. However, this dimmable power supply can only be separately provided with the phase-cut dimmer or the analog signal dimmer. The same dimmable power supply cannot be compatible with both a phase-cut dimming function and an analog signal dimming function, and color temperatures are switched or brightness is adjusted through a switch separately. Furthermore, there is one or two built-in curves for selection. However, a bus voltage of the power supply cannot be adjusted, and this power supply lacks overtemperature and pressure reduction protection and multi-path independent output functions. In addition, this power supply does not support compatibility with both the phase-cut dimming and analog signal dimming, so that it cannot meet a requirement for simultaneous dimming and color adjustment. This power supply also has problems such as a single function and large limitations on an input voltage. A wide voltage input cannot be achieved, such as 110-277 AC or 200-347 AC. Therefore, there are some challenges in compatibility, universality, and flexibility in application.

SUMMARY

The present disclosure provides a multifunctional dimmable driving power supply to solve the technical problems mentioned above.

Technical solutions in the present disclosure are implemented as follows:

A multifunctional dimmable driving power supply includes an alternating current (AC) input, a high-power factor correction circuit, an AC/direct current (DC) conversion circuit, a load, a phase-cut input signal, an analog input signal, a micro control unit (MCU) control module, a multishift switching device, a metal oxide semiconductor field effect transistor (MOSFET) driving circuit, a rotational potentiometer, and a temperature sensor module, wherein an output end of the analog input signal, an output end of the MOSFET driving circuit, an output end of the phase-cut input signal, an output end of the rotational potentiometer, and an output end of the temperature sensor module are connected to an input end of the MCU control module; an input end of the AC input is connected to an input end of the high-power factor correction circuit and an input end of the phase-cut input signal respectively; an output end of the high-power factor correction circuit is connected to an input end of the AC/DC conversion circuit; an output end of the AC/DC conversion circuit is connected to an input end of the load; and an output end of the MCU control module is also connected to the input end of the AC/DC conversion circuit.

Further, a voltage of the AC input is a universal voltage, and a voltage value is 110-277 AC or 200-347 AC.

Further, the AC/DC conversion circuit converts an AC to a DC voltage; the phase-cut input signal controls dimming or color temperature adjustment; and the analog input signal performs dimming and color temperature adjustment on two analog signals.

Further, the MCU control module controls a voltage output by the AC/DC and a signal of the MOSFET driving circuit; and the MCU control module detects the temperature sensor module, controls the voltage output by the AC/DC by receiving a signal from the rotational potentiometer, and switches an output color temperature, an output frequency, and an output curve by reading the multishift switching device.

Further, the MOSFET driving circuit performs pulse width modulation (PWM) dimming and color temperature adjustment; and the temperature sensor module obtains a temperature of the power supply.

Further, the phase-cut input signal is a phase-cut dimmer, including a front phase-cut dimmer and a rear phase-cut dimmer; and there are two groups of analog input signals which are analog signal dimmers, including a 0-10V dimmer, a 1-10V dimmer, a 10V PWM dimmer, and a resistance dimmer.

Beneficial effects of the present disclosure are as follows:

(1) The multishift switching device on the power supply is used to select different frequency outputs, so that the multifunctional dimmable driving power supply has high universality. Furthermore, the power supply has a single-loop or two-loop analog dimming signal and a phase-cut dimming function to select different output color temperatures, output frequencies, and output curves, so that the power supply meets a user requirement for adjusting brightness and adjusting a color temperature value and a user requirement for adjusting light and adjusting a color. The power supply is smooth in dimming without strobing, and has multiple functions.

(2) An output bus voltage is adjusted by an adjustable potentiometer to solve the problem of an output voltage drop. Meanwhile, after a lamp has light attenuation, a bus voltage can be adjusted for light attenuation compensation through the adjustable potentiometer device on the power supply. Moreover, when a user does not use an external dimmer to adjust the brightness, an output voltage can be adjusted using a fine-adjustment device, so as to achieve the purpose of changing the brightness.

BRIEF DESCRIPTION OF THE DRAWINGS

FIG. 1 is a schematic structural diagram of the present disclosure.

1: AC input; 2: high-power factor correction circuit; 3: AC/DC conversion circuit; 4: load; 5: phase-cut input signal; 6: analog input signal; 7: MCU control module; 8: multishift switching device; 9: MOSFET driving circuit; 10: rotational potentiometer; and 11: temperature sensor module.

DETAILED DESCRIPTION OF THE EMBODIMENTS

As shown in FIG. 1, the present disclosure discloses a multifunctional dimmable driving power supply, including an AC input 1, a high-power factor correction circuit 2, an AC/DC conversion circuit 3, a load 4, a phase-cut input signal 5, an analog input signal 6, an MCU control module 7, a multishift switching device 8, a MOSFET driving circuit 9, a rotational potentiometer 10, and a temperature sensor module 11, wherein an output end of the analog input signal 6, an output end of the MOSFET driving circuit 9, an output end of the phase-cut input signal 5, an output end of the rotational potentiometer 10, and an output end of the temperature sensor module (11) are connected to an input end of the MCU control module 7; an input end of the AC input 1 is connected to an input end of the high-power factor correction circuit 2 and an input end of the phase-cut input signal 5 respectively; an output end of the high-power factor correction circuit 2 is connected to an input end of the AC/DC conversion circuit 3; an output end of the AC/DC conversion circuit 3 is connected to an input end of the load 4; and an output end of the MCU control module 7 is also connected to the input end of the AC/DC conversion circuit 3.

Further, a voltage of the AC input 1 is a universal voltage, and a voltage value is 110-277 AC or 200-347 AC. The high-power factor correction circuit 2 has low harmonic and has small interference to a power grid.

Further, the AC/DC conversion circuit 3 converts an AC to a DC voltage; the load 4 is generally a light emitting diode (LED) light strip or an LED lamp; for the phase-cut input signal 5, when a phase-cut dimmer is connected, a signal is obtained for dimming control or color adjustment; and the analog input signal 6 can achieve dimming and color temperature adjustment functions by two analog signals.

Further, the MCU control module 7 can controls a voltage output by the AC/DC and a signal of the MOSFET driving circuit 9, so that dimming can be performed more smoothly without strobing. The MCU control module can also detect the temperature sensor module 11. When a temperature is extremely high, corresponding intelligent adjustment is performed, so that the life of the power supply is longer. The MCU control module controls the voltage output by the AC/DC by receiving a signal of the rotational potentiometer 10. The MCU control module also switches an output color temperature, an output frequency, and an output curve by reading the multishift switching device 8.

Further, the multishift switching device 8 can switch the output color temperature, the output frequency, and the output curve. The MOSFET driving circuit 9 achieves PWM dimming and color temperature adjustment. The rotational potentiometer 10 can control the voltage output by the AC/DC to adjust an output bus voltage. The temperature sensor module 11 obtains a temperature of the power supply itself.

Further, the phase-cut input signal 5 is a phase-cut dimmer, including a front phase-cut dimmer and a rear phase-cut dimmer; and there are two groups of analog input signals 6 which are analog signal dimmers, including a 0-10V dimmer, a 1-10V dimmer, a 10V PWM dimmer, and a resistance dimmer.

The multishift switching device 8 on the power supply is used to select different frequency outputs, so that the multifunctional dimmable driving power supply has high universality. A lamp which has a requirement for an input frequency does not need to be specially made, but can be produced in mass in a large scale, thus reducing the cost and improving the efficiency. Different shifts correspond to different output frequencies, and a frequency value is between 250 Hz and 25 KHz. The power supply has a single-loop or two-loop analog dimming signal and a phase-cut dimming function, so that the power supply meets a user requirement for adjusting brightness and adjusting a color temperature value and a user requirement for adjusting light and adjusting a color. The power supply is smooth in dimming without strobing, and has multiple functions. Various different dimming curves can also be defined to well adapt to lamps formed using different LED serial and parallel connection schemes, and the compatibility of the matched dimmers is also greatly improved.

The output bus voltage is adjusted by using the rotational potentiometer 10 to solve the problem of an output voltage drop. Meanwhile, after a lamp has light attenuation, a bus voltage can be adjusted for light attenuation compensation through the rotational potentiometer 10 on the power supply. Moreover, when a user does not use an external dimmer to adjust the brightness, an output voltage can be adjusted using a fine-adjustment device, so as to achieve the purpose of changing the brightness. The brightness or color temperature be switched through the AC input 1 used as a switch, and different color temperature values can also be selected through the multishift switching device 8 on the power supply. Different shifts correspond to different output color temperature values, and a color temperature value is from 1800 K to 7000 K. The brightness can also be adjusted using the phase-cut dimmer or the analog signal dimmer.

When a plurality of dimmable power supplies are intensively controlled, the user may find that color temperatures are inconsistent when a switch is used to switch the color temperatures. The AC input 1 used as a switch can be used to solve the problem of consistency. When the power supply has an extremely high temperature, an output is recognized by an algorithm program, and a current is automatically reduced to balance the temperature of the power supply or control the temperature of the power supply to decrease, so that the life of the power supply is greatly ensured. In this process, strobing, light-off, and the like will be avoided, and an extremely good experience can be brought to the user. Furthermore, a power factor of the power supply is greater than 0.95 under a full load, with minimal harmonics and ripples. The dimmable power supply has the characteristics of high efficiency and small temperature rise. The power supply automatically recognizes whether the AC input 1 used as a switch switches the color temperature or the input AC is powered off, which solves the problem of the T24 standard and achieves repeated quick turning on and off. During the repeated turning on and off, a smooth lighting effect is ensured, and light does not have a visual impact on the naked eye.

What is claimed is:

1. A multifunctional dimmable driving power supply, comprising an alternating current (AC) input, a high-power factor correction circuit, an AC/direct current (DC) conversion circuit, a load, a phase-cut input signal, an analog input signal, a micro control unit (MCU) control module, a multishift switching device, a metal oxide semiconductor field effect transistor (MOSFET) driving circuit, a rotational potentiometer, and a temperature sensor module, wherein an output end of the analog input signal, an output end of the MOSFET driving circuit, an output end of the phase-cut input signal, an output end of the rotational potentiometer, and an output end of the temperature sensor module are connected to an input end of the MCU control module; an input end of the AC input is connected to an input end of the high-power factor correction circuit and an input end of the phase-cut input signal respectively; an output end of the high-power factor correction circuit is connected to an input end of the AC/DC conversion circuit; an output end of the AC/DC conversion circuit is connected to an input end of the load; and an output end of the MCU control module is also connected to the input end of the AC/DC conversion circuit;

wherein a voltage of the AC input is a universal voltage, and a voltage value is 110-277 AC or 200-347 AC;

wherein the AC/DC conversion circuit converts an AC to a DC voltage; the phase-cut input signal controls dimming or color temperature adjustment; and the analog input signal performs dimming and color temperature adjustment on two analog signals;

wherein the MCU control module controls a voltage output by the AC/DC and a signal of the MOSFET driving circuit; and the MCU control module detects the temperature sensor module, controls the voltage output by the AC/DC by receiving a signal from the rotational potentiometer and switches an output color temperature, an output frequency, and an output curve by reading the multishift switching device;

wherein the MOSFET driving circuit performs pulse width modulation (PWM) dimming and color temperature adjustment; and the temperature sensor module obtains a temperature of the power supply; and wherein the phase-cut input signal is a phase-cut dimmer, comprising a front phase-cut dimmer and a rear phase-cut dimmer; and there are two groups of analog input signals which are analog signal dimmers, comprising a 0-10V dimmer, a 1-10V dimmer, a 10V PWM dimmer, and a resistance dimmer.

* * * * *